(12) United States Patent
Spooner

(10) Patent No.: US 6,254,506 B1
(45) Date of Patent: Jul. 3, 2001

(54) TRANSMISSION FOR FOUR-WHEEL DRIVE VEHICLE

(75) Inventor: John Spooner, Warwickshire (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/424,595

(22) PCT Filed: Jun. 4, 1998

(86) PCT No.: PCT/GB98/01479

§ 371 Date: Nov. 24, 1999

§ 102(e) Date: Nov. 24, 1999

(87) PCT Pub. No.: WO98/55336

PCT Pub. Date: Dec. 10, 1998

(30) Foreign Application Priority Data

Jun. 7, 1997 (GB) .................................................. 9711703
Jun. 7, 1997 (GB) .................................................. 9711704
Jun. 7, 1997 (GB) .................................................. 9711705

(51) Int. Cl.$^7$ ............................. F16H 48/24; F16H 48/26
(52) U.S. Cl. ........................... 475/249; 475/89; 475/199; 180/249
(58) Field of Search ............................... 475/249, 84, 89, 475/198, 199, 221, 248; 180/248, 249

(56) References Cited

U.S. PATENT DOCUMENTS

| 4,074,591 | * | 2/1978 | Dick | 475/249 |
| 4,526,063 | | 7/1985 | Oster . | |
| 4,677,875 | * | 7/1987 | Batchelor | 475/249 |
| 4,699,237 | | 10/1987 | Matsumoto | 180/250 |
| 4,781,078 | * | 11/1988 | Blessing et al. | 475/249 |
| 4,973,294 | * | 11/1990 | Kobari et al. | 475/249 |
| 5,097,921 | * | 3/1992 | Tezuka | 475/249 |
| 5,171,294 | * | 12/1992 | Takano et al. | 475/249 |
| 5,415,598 | * | 5/1995 | Sawase et al. | 475/249 |

FOREIGN PATENT DOCUMENTS

| 4113963 | 11/1991 | (DE) . |
| 0237147 | 1/1987 | (EP) . |
| 1475141 | 6/1977 | (GB) . |
| 2115506 | 2/1983 | (GB) . |
| 2234022 | 6/1990 | (GB) . |
| 2246823 | 7/1991 | (GB) . |

* cited by examiner

Primary Examiner—Sherry Estremsky
(74) Attorney, Agent, or Firm—Davis & Bujold, P.L.L.C.

(57) ABSTRACT

A motor vehicle transmission has a differential assembly (17) in which one input, sun gear (39), of an epicyclic gear train can be selectively coupled by a sleeve (59) through a viscous coupling (55) to either an input, i.e. annulus gear (31), or to another output, i.e. carrier (36). Coupling the sun gear to the annulus gear gives a low resistance mode of operation and coupling the sun gear to the carrier gives a high resistance mode of operation. A locked mode where the annulus is locked to the sun gear is also described, together with a free mode where the viscous coupling is disconnected from both the annulus gear and the carrier. The sleeve is lined to the control of a range change gearbox to select the low resistance mode when a high range is selected for on-road use and a high resistance mode is selected when a low range is selected for off-road use.

25 Claims, 3 Drawing Sheets

TRANSMISSION FOR FOUR-WHEEL DRIVE
VEHICLE

FIELD OF THE INVENTION

This invention relates to motor vehicle transmissions of the kind in which a differential assembly has an input for connection to an engine, first and second outputs for transmitting drive from the input to respective road wheels or groups of road wheels and a speed dependent resistance device for applying a torque reaction in response to relative rotation between the outputs, the torque reaction increasing with the rotational speed of the relative rotation. Transmissions of this kind are generally known, e.g. from GB-A-1 475 141 which shows a simple 3-element epicyclic differential assembly and a viscous coupling acting as the speed dependent resistance device. Furthermore, DE-A-4 113 963 shows a viscous coupling acting between the outputs of a bevel gear differential, a dog clutch providing selection between a controlled mode and a locked mode.

BACKGROUND OF THE PRESENT INVENTION

The requirements of such motor vehicle transmissions vary according to vehicle operating conditions. In general, the resistance device is required to provide a low resistance at high vehicle speeds and a high resistance at low vehicle speeds. Hence the degree of resistance is usually a compromise between these requirements.

OBJECT OF THE PRESENT INVENTION

It is an object of the invention to provide a motor vehicle transmission of the kind referred to which allows the above requirements to be met more readily.

SUMMARY OF THE PRESENT INVENTION

According to the invention there is provided a motor vehicle transmission including a differential assembly having an input for connection to an engine, first and second outputs for transmitting drive from the input to respective road wheels or groups of road wheels and a speed dependent resistance device for applying a torque reaction in response to relative rotation between the outputs, the torque reaction increasing with the rotational speed of the relative rotation, characterised in that the speed dependent resistance device is operable to selectively couple the first output to the second output or to the input whereby the differential assembly is provided with at least two operating modes, a low resistance mode providing a low resistance to the relative rotation and a high resistance mode providing a high resistance to the relative rotation.

The differential assembly may also have a free mode of operation in which there is no resistance to relative rotation between the outputs. This is useful for high speed conditions. Furthermore, the differential assembly may also have a locked mode of operation in which relative rotation between the outputs is prevented. This is useful for extreme slippery conditions.

Conveniently the low resistance mode is obtained when the resistance device is connected between the first output and the input whilst the high resistance mode may be obtained when the resistance device is connected between the first output and the second output.

The differential assembly may further comprise a sleeve which is moveable between positions in which said operating modes are selected, in which case the resistance device may have two rotary members, relative rotation of which provides the torque reaction, one rotary member being coupled to the first output and the sleeve being coupled to but axially slidable relative to the other rotary member. Conveniently, the sleeve may be selectively connected to the differential input to effect the low resistance mode and, to effect the high resistance mode, the sleeve may be selectively connected to the second differential output. To effect the free mode the sleeve may be selectively disconnected from both the second differential output and the differential input and, to effect the locked mode, the sleeve may be selectively connected to the differential input and the second differential output.

The differential assembly may comprise an epicyclic gear train having an annulus gear which acts as the input, a sun gear which acts as the first output, a carrier which acts as the second output, a first set of planet gears, each rotatably supported by the carrier and in intermeshing engagement with the annulus gear, and a second set of planet gears each rotatably supported by the carrier and in intermeshing engagement both with a respective planet gear of the first set and with the sun gear.

Preferably, the speed sensitive device is a viscous coupling.

The transmission may further comprise a range change gearbox having a high range for normal use and a low range for use in difficult conditions and a range change mechanism to effect a change between the high and low ranges, in which case the operation of the differential assembly may be operatively linked to the range change mechanism such that when the range change gearbox is in the high range the differential assembly is operable in the low resistance mode and when the range change gearbox is in the low range the differential assembly is operable in the high resistance mode.

The transmission may include a main gearbox providing a range of forward gear ratios and a gear shift mechanism to select different ratios in the main gearbox, operation of the differential assembly being operatively linked to the gear shift mechanism such that when the range change gearbox is in the high range and the main gearbox is in a high ratio the differential assembly is in the free mode. Alternatively or additionally, the operation of the differential assembly may be operatively linked to the gear shift mechanism such that when the range change gearbox is in the low range and the main-gearbox is in a low ratio the differential assembly is in the locked mode.

Where the transmission includes a main gearbox providing a range of forward gear ratios and a gear shift mechanism to select different ratios in the main gearbox, the operation of the differential assembly may be operatively linked to the gear shift mechanism such that when the main gearbox is in a low ratio the differential assembly is in the high resistance mode and when the main gearbox is in a high ratio the differential assembly is in the low resistance mode. Such an arrangement is useful where there is no range change gearbox. In such a case, the operation of the differential assembly may be operatively linked to the gear shift mechanism such that when the main gearbox is in its highest ratio the differential assembly is in the free mode. Alternatively or additionally, the operation of the differential assembly may be operatively linked to the gear shift mechanism such that when the main gearbox is in its lowest ratio the differential assembly is in the locked mode.

The transmission may further comprise control means operative to change the differential assembly between the low and the high resistance modes, the control means being sensitive to vehicle road speed to put the differential assembly in the low resistance mode when the vehicle is travelling above a high/low threshold road speed and to put the differential assembly in the high resistance mode when the vehicle is travelling below the high/low threshold road speed. In such a case, the control means may be operative to put the differential assembly in the free mode when the vehicle is travelling above a low/free threshold road speed higher than the high/low threshold road speed and may be operative to put the differential assembly in the locked mode when the vehicle is travelling below a high/locked threshold road speed lower than the high/low threshold road speed. Selection of the free mode according to road speed may be usefully combined with the other methods of selection so that, for example, selection dependent on selection of a high ratio in the main gearbox or dependent on both selection of a high ratio in the main gearbox and selection of a high ratio in the range change gearbox is conditional on the vehicle travelling above the low/free threshold road speed.

BRIEF DESCRIPTION OF THE DRAWING(S)

The invention will now be described by way of example with reference to the accompanying drawings, of which:

DESCRIPTION OF THE PREFERRED EMBODIMENT(S)

Figure 1:
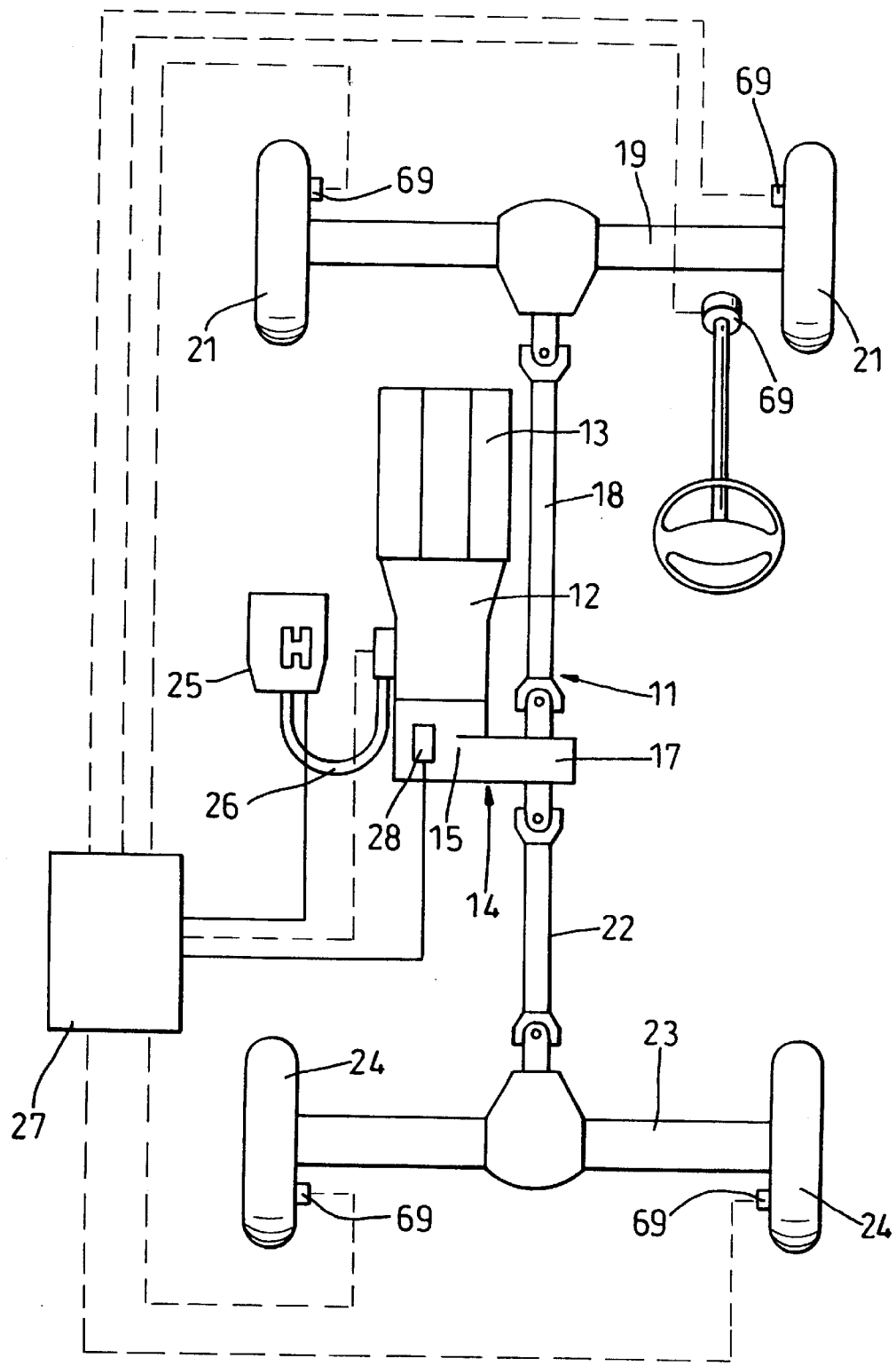
FIG. 1 is a schematic diagram of a motor vehicle transmission according to the invention.
Figure 2:
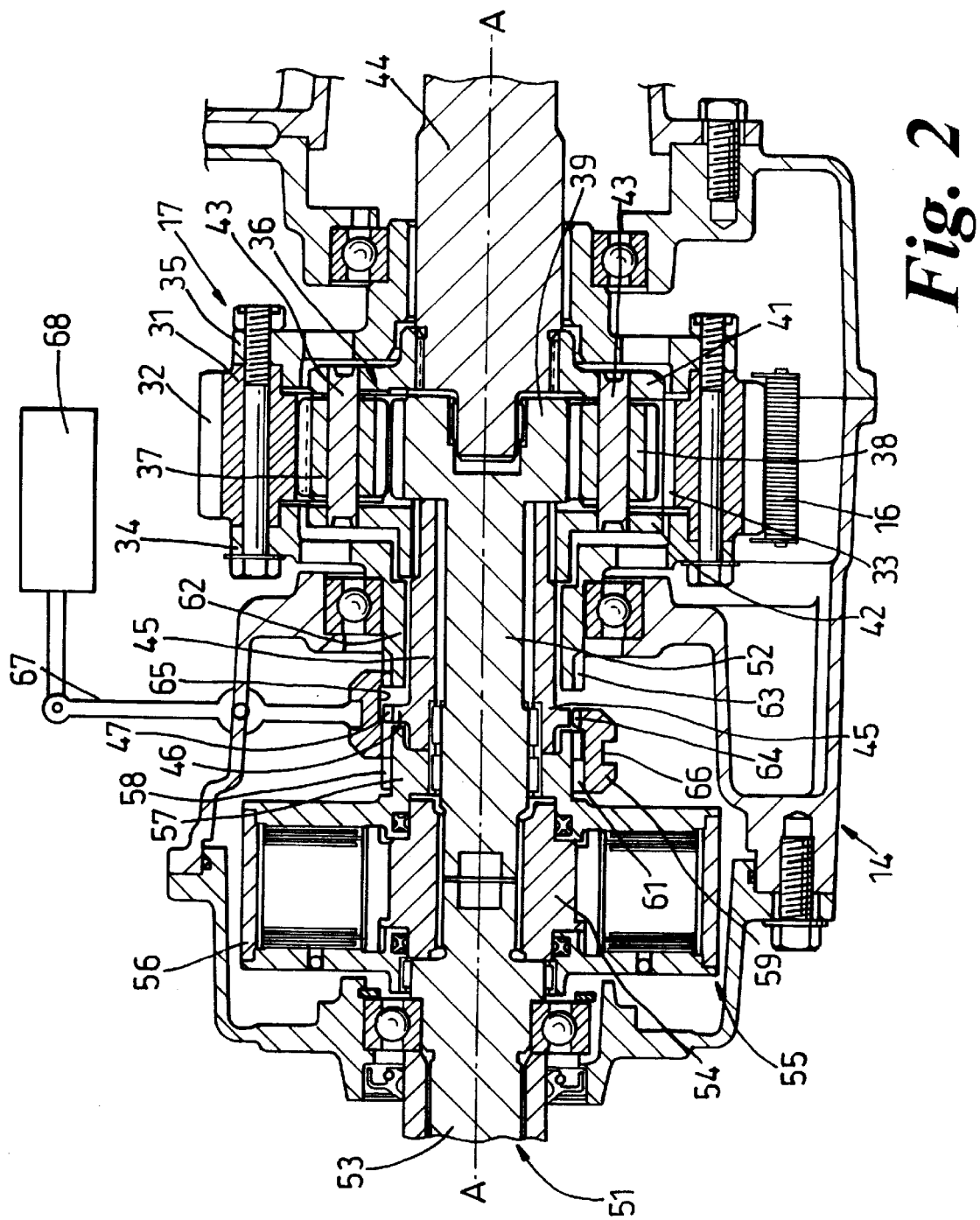
FIG. 2 is a cross-section of a differential assembly incorporated in the transmission shown in FIG. 1.

With reference to FIGS. 1 and 2, a transmission 11 for a four wheel drive vehicle includes a main gearbox 12 driven by an engine 13 and a transfer case 14. The main gearbox 12 is a conventional automatic transmission assembly providing a range of forward gear ratios between the engine 13 and the transfer case 14 where drive is transmitted through a range change gearbox 15 by a toothed chain 16 to a differential assembly 17. A front propshaft 18 can transmit drive from the differential assembly 17 to a front axle 19 carrying front road wheels 21 and a rear propshaft 22 can transmit drive from the differential assembly to a rear axle 23 carrying rear road wheels 24.

A gearbox selector 25 is connected by a Bowden cable 26 to the main gearbox 12 and is connected through an electronic control unit (ECU) 27 to an actuator 28 which effects ratio changes in the range change gearbox 15. The arrangement is generally as described in U.S. Pat. No. 5,566,582 which is hereby incorporated by reference.

The differential assembly 17 has an input in the form of an annulus gear 31 having sprocket teeth 32 on its outer diameter and internal gear teeth 33 on its inner periphery, the annulus gear being bolted between a pair of flanged rotary housing members 34 and 35. A carrier 36 is rotatably supported between the housing members 34, 35 within the annulus gear 31 and carries two sets of planet gears 37 and 38. Each planet gear 37 of the first set is in intermeshing engagement with the gear teeth 33 of the annulus gear 31 and each planet gear 38 of the second set is in intermeshing engagement both with a respective planet gear of the first set and with a sun gear 39.

The sun gear 39 is part of a front output shaft 51 which is connected to the front propshaft 18 and acts as a first output of the differential assembly 17. The front output shaft 51 comprises a rear section 52 which includes the sun gear 39 and a front section 53, the sections 52 and 53 both being splined to an inner hub 54 of a viscous coupling 55. The carrier 36 acts as a second output of the differential assembly 17 and comprises a pair of flanges 41 and 42 interconnected by bearing pins 43 on which the planet gears 37 and 38 are rotatably supported. One flange 41 is splined to a rear output shaft 44 which is connected to the rear propshaft 22 whilst the other flange 42 is splined to an inner hollow shaft 45 having a flange 46 with external splines 47.

The viscous coupling 55 is generally conventional, having a number of plates separated by a viscous fluid, some of the plates being connected to the inner hub 54 and the other plates being connected to an outer rotary housing 56 which includes a boss 57 having external splines 58. A sleeve 59 has a first set of internal splines 61 which mesh with the splines 58 on the viscous coupling boss 57 so that the sleeve can slide axially on the boss but rotates with it. An outer hollow shaft is formed as a forward extension of the rotary housing member 34 and has external splines 63 which match splines 52 and 58. The sleeve 59 has further internal splines 64, conveniently referred to as the selector splines, which are spaced from internal splines 61 by an annular recess 65 and a circumferential groove 65 engaged by a forked lever 67. An actuator 68 is connected to the lever 67 so that the sleeve 59 is axially moveable by the actuator between certain positions, as will be described below.

In a first position as shown in FIG. 2 above the axial centre line A—A, the sleeve 59 is positioned such that the selector splines 64 engage the splines 63 on the outer hollow shaft 62 to connect the viscous coupling outer housing 56 to the annulus gear 31. In this position the differential assembly 17 is in a low resistance mode as will be explained below.

In a second position as shown in FIG. 2 below the axial centre line A—A, the sleeve 59 is positioned such that the selector splines 64 engage the splines 47 on the inner hollow shaft 45 to connect the viscous coupling outer housing 56 to the carrier 36. In this position the differential assembly is in a high resistance mode.

The differential assembly 17 is arranged so that the number of gear teeth 33 on the annulus gear 31 is twice the number of gear teeth on the sun gear 39, the planet gears 37 and 38 having equal numbers of gear teeth. The differential assembly 17 functions as follows. Drive is transmitted through the annulus gear 31 and both the carrier 36 and the sun gear 39 rotate at the same speed. If the rotational speed of the sun gear 37 increases by an amount $\Delta N$ above the speed of the annulus gear 31, e.g. due to wheel spin of one or both of the front wheels 21, then the speed of the carrier 36 decreases by a corresponding amount and the speed difference between the sun gear 37 and the carrier is $2.\Delta N$. Hence, when the differential assembly 17 is in the low resistance mode, the difference between the rotational speed of the hub 54 and the outer housing 56 of the viscous coupling 55 is $\Delta N$ whereas, when the differential assembly 17 is in the high resistance mode, the difference between the rotational speed of the hub 54 and the outer housing 56 of the viscous coupling 55 is $2.\Delta N$. The characteristics of the viscous coupling 55 are that the torque reaction is directly proportional to the rotational speed difference between the hub 54 and the outer housing 56 so that the resistance in the high resistance mode is twice that in the low resistance mode.

The actuator 68 which moves the sleeve 59 is controlled by the ECU 27 so that when the range change gearbox 15 is in the higher of its two ratios the actuator 68 moves the lever 67 to enable the sleeve 59 to select the low resistance mode of the differential assembly 17 and when the range change gearbox is in the lower ratio the lever 67 is moved to enable the sleeve to select the high resistance mode. Hence selection of the appropriate mode is made according to the ratio selected in the range change gearbox 15, low resistance for on-road conditions and high resistance for off-road conditions.

Instead of separate actuators 28, 68 for the range change gearbox 15 and the differential assembly 17, the lever 67 may be mechanically linked to the range change actuator 28. Indeed, if the range change gearbox 15 has a selector mechanism which is selected by a mechanical linkage under the direct control of the driver, the lever 67 may be mechanically linked to such a mechanism.

Optionally, the differential assembly 17 may have two further operating modes, namely a locked mode and a free mode. The locked mode is obtained by moving the sleeve 59 into a position to the right of that shown above the axial centre line A—A in FIG. 2 where the selector splines 64 remain engaged with the splines 63 on the outer hollow shaft 62 whilst sleeve splines 61 engage the splines 47 on the inner hollow shaft 45. This locks the annulus gear 31 to the carrier 36, preventing any relative rotational movement between the annulus gear, the carrier and the sun gear 39. The locked mode is useful for extreme slippery conditions.

The free mode is obtained by moving the sleeve 59 into a position intermediate those shown in FIG. 2 where the selector splines 64 are between the splines 47 on the inner hollow shaft 45 and the splines 63 on the outer hollow shaft 62. The viscous coupling outer housing 56 is then not engaged to any other component of the differential assembly 17 and there is no resistance to relative rotation between the sun gear 39 and the carrier 36. The free mode is useful for high speed on-road conditions since it avoids losses and heat build up in the viscous coupling 55 which otherwise can occur if the tires on the front and rear wheels 21 and 24 are mis-matched.

The free mode may be selected by a manual override switch on the ECU 27 or may be selected by the ECU when the driver selects both the high range in the range change gearbox 15 and a high ratio in the main gearbox 12. The locked mode may also be selected by a manual override switch on the ECU 27. Whilst the ECU 27 may be arranged to select the locked mode automatically when the driver selects both the low range in the range change gearbox 15 and a low ratio in the main gearbox 12, this would make the vehicle difficult to steer. To overcome this problem, there is optionally a steering angle sensor 69 which can transmit a steering angle signal to the ECU 27 to enable automatic selection of the locked mode only when the steered wheels are substantially in the straight-ahead position.

Optionally, and particularly if the range change gearbox 15 is omitted, the differential assembly 17 may be linked, either mechanically or electrically, to the gear shift mechanism 25 such that when the main gearbox 12 is in a low ratio the differential assembly is in the high resistance mode and when the main gearbox is in a high ratio the differential assembly is in the low resistance mode. Furthermore, when the main gearbox 12 is in its highest ratio the differential assembly can be put in the free mode. Again, there is the possibility that if the main gearbox 12 is in its lowest ratio the differential assembly can be put in the locked mode but again this is preferred that the locked mode is selected manually unless automatic selection is restricted to the steering being in the straight-ahead position only.

Alternative or additional controls are optionally available from road speed signals derived from road speed sensors 71 connected to the ECU 27. For example, the ECU 27 may operate to put the differential assembly 17 in the low resistance mode when the vehicle is travelling above a predetermined road speed, conveniently referred to as the high/low mode threshold speed, and to put the differential assembly in the high resistance mode when the vehicle is travelling below the high/low mode threshold speed. When the vehicle is travelling above a second predetermined road speed, conveniently referred to as the low/free mode threshold speed, higher than the high/low mode threshold, the ECU 27 may operate to put the differential assembly 17 in the free mode. Again, there is the possibility of automatic selection of the locked mode if the vehicle is travelling below a third predetermined road speed, conveniently referred to as the high/locked mode threshold speed, lower than the high/low mode threshold but again it is preferable that the locked mode is selected manually unless automatic selection is restricted to the steering being in the straight-ahead position only. Obviously, values of such threshold speeds may include a dead-band (hysteresis) to avoid hunting between modes.

The road speed signals may be used by the ECU 27 to put the differential assembly 17 in the free mode when the vehicle is travelling above the low/free mode threshold speed when other methods of selecting the low and high resistance modes are used as previously referred to, i.e., if selected according to the high/low selection of the range change gearbox 15 or high/low selection in the main gearbox 12. Alternatively, if the free mode if selected according to the high/low selection of the range change gearbox 15 and/or high/low selection in the main gearbox 12 as previously described, such selection may be conditional on the vehicle travelling above the low/free mode threshold speed.

Figure 3:
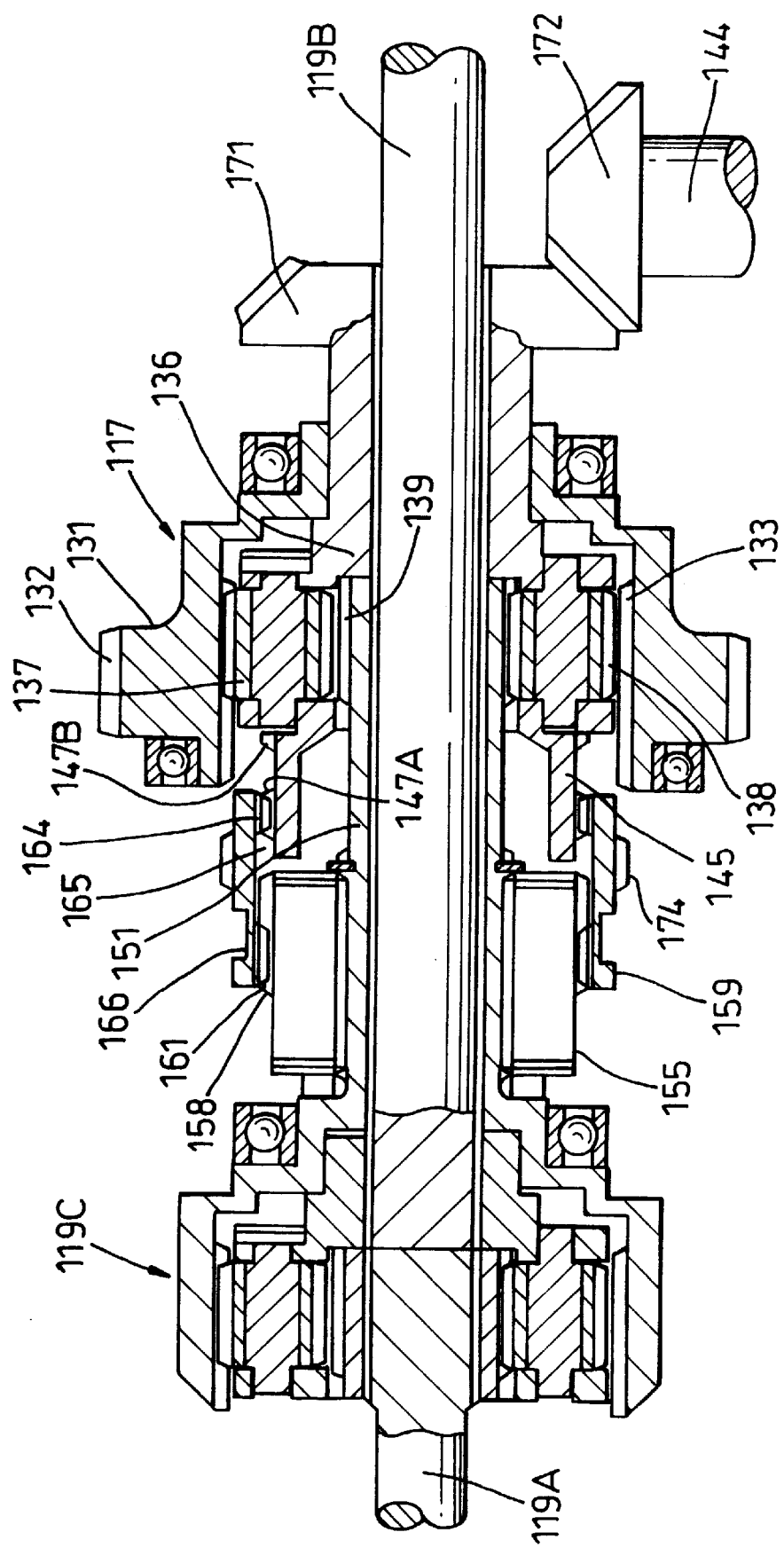
FIG. 3 is a cross-section of an alternative differential assembly for use in a motor vehicle transmission according to the invention.

With reference to FIG. 3, the alternative differential assembly 117 is suitable for use in a four wheel drive transmission for use with a motor vehicle having a transverse engine. In many respects the differential assembly 117 is similar to differential assembly 17 shown in and described with reference to FIG. 2 so that where appropriate the same reference numerals are retained but with the addition of 100.

An annulus gear 131 has external gear 132 for transmission of drive from a main gearbox (not shown) and internal gear teeth 133. A carrier 136 is rotatably supported within the annulus gear 131 and carries two sets of planet gears 137 and 138, the first set 137 meshing with the gear teeth 133 of the annulus gear 131 and the second set 138 each meshing both with a respective planet gear of the first set and with a sun gear 139.

The carrier 136 is connected by bevel gears 171 and 172 to a rear output shaft 144 for connection to a rear propshaft driving a rear axle. A tubular extension 145 of the carrier 136 has two sets of external splines 147A and 147B. The sun gear 139 is part of a hollow front output shaft 151 which is connected to left and right hand front driveshafts 119A and 119B through a front differential assembly 119C which uses epicyclic gear components of the same type as used in the differential assembly 117. The front output shaft 151 is coupled to the inner hub of a viscous coupling 155 which has an outer rotary housing having external splines 158. A sleeve 159 has a first set of internal splines 161 which mesh with the viscous coupling housing splines 158, a set of external splines 174, conveniently referred to as the external selector splines, and a second set of internal splines 164, conveniently referred to as the internal selector splines, which are spaced from internal splines 161 by an annular recess 165.

A circumferential groove 166 in the sleeve is engaged by a forked lever (not shown) so as to axially move the sleeve in a similar manner to the lever 67.

In a first position, the sleeve 159 is positioned as shown in FIG. 3 such that the internal selector splines 164 engage the left hand splines 147A on the carrier tubular extension 145 to connect the outer housing of the viscous coupling 155 to the carrier 136. In this position the differential assembly is in the high-resistance mode..

In a second position, the sleeve 159 is positioned with the external selector splines 174 in engagement with the internal teeth 133 on the annulus gear 131 to connect the outer housing of the viscous coupling 155 to the annulus gear. In this position the differential assembly 117 is in the low resistance mode.

Like the differential assembly 17, the differential assembly 117 may optionally operate in a locked mode and a free mode. The locked mode is obtained by moving the sleeve 159 into a position to the extreme right of that shown in FIG. 3; the external selector splines 174 remain engaged with the annulus gear teeth 133 whilst the internal selector splines 164 engage the splines 147B on the carrier tubular extension 145. The free mode is obtained by moving the sleeve 59 into a position intermediate the positions for the high and low resistance modes, i.e., slightly to the right of the position shown in FIG. 3; the internal selector splines 164 are then positioned between the viscous coupling housing splines 158 and the splines 147A on the carrier tubular extension 145.

Whilst the differential assembly 17, 117 may be arranged so that the number of gear teeth 33, 133 on the annulus gear 31, 131 is twice the number of gear teeth on the sun gear 39, 139, and the planet gears 37, 137 and 38, 138 have equal numbers of gear teeth, this is not essential for the invention and where other ratios are chosen there will be an appropriate variation in the torques generated by the viscous coupling 55, 155 when in the low and high modes of operation. Furthermore, any consideration of the relative rotational speeds of the viscous coupling members will have to allow for any variation in the rolling radius of each of the road wheels 21, 24 and any differences between the transmission ratios in the drive line from the differential assembly 17, 117 to the road wheels.

The viscous couplings 55 or 155 could be replaced by other suitable speed dependant resistance devices, e.g. a 'Hydratrak'(Trade Mark) unit as illustrated by U.S. Pat. No. 5,598,911 or a Gerodisc (Trade Mark) unit as illustrated by U.S. Pat. No. 5,611,746.

Similarly, other types of geared differential, e.g. a bevel type, could be used in place of the epicyclic types used in the differential assemblies 17 and 117, provided that it is possible to selectively couple a first output to a second output and the input to provide a low resistance mode and a high resistance mode as described above. In the case of the bevel type of differential, it is not usually the case that elements of the input and the two outputs can be arranged co-axially on one side of the differential as is the case with the epicyclic types used in the differential assemblies 17 and 117. In that case elements of the input and one of the outputs may be arranged co-axially on one side of the differential together with a hollow shaft driven by gears or a chain by a layshaft which is itself driven by gears or a chain by the other output.

Although in the motor vehicle transmissions described above, the differential assemblies 17 and 117 have been described with reference to their use as a centre differential to split drive between front and rear wheels, they can also be used as an axle differential to-split drive between wheels on the same axle.

What is claimed is:

1. A motor vehicle transmission including a differential assembly having;
    an input which is connected, in use, to an engine;
    first and second outputs arranged to transmit drive from the input to respective road wheels or groups of road wheels; and,
    a speed dependent resistance device to apply a torque reaction in response to relative rotation between the outputs, the torque reaction increases with the rotational speed of the relative rotation between the outputs and the speed dependent resistance device is operable to selectively couple the first output to one of the second output and to the input whereby the differential assembly is provided with at least two operating modes, a low resistance mode providing a low resistance to the relative rotation and a high resistance mode providing a high resistance to the relative rotation, the differential assembly being configured to operate in one of said low resistance mode and said high resistance mode dependent upon the rotational speed of the relative rotation between the outputs.

2. The transmission as claimed in claim 1, wherein the differential assembly is configured to have a free mode of operation in which there is no resistance to relative rotation between the outputs.

3. The transmission as claimed in claim 2, further comprising control means sensitive to vehicle road speed to put the differential assembly in the free mode when the vehicle is traveling above a low/free mode threshold road speed.

4. The transmission as claimed in claim 2, further comprising a range change gearbox having a high range for normal use and a low range for use in difficult conditions and a range change mechanism to effect a change between the high and low ranges, and a main gearbox providing a range of forward gear ratios and a gear shift mechanism to select different ratios in the main gearbox wherein the operation of the differential assembly is operatively linked to the gear shift mechanism such that when the range change gearbox is in the high range and the main gearbox is in a high ratio the differential assembly is in the free mode.

5. The transmission as claimed in claim 4, further comprising control means sensitive to vehicle road speed, the control means being operative to inhibit the free mode except when the-vehicle is traveling above a low/free mode threshold road speed.

6. The transmission as claimed in claim 1, wherein the differential assembly is configured to have a locked mode of operation in which relative rotation between the outputs is prevented.

7. The transmission as claimed in claim 6, further comprising a range change gearbox having a high range for normal use and a low range for use in difficult conditions and a range change mechanism to effect a change between the high and low ranges, and a main gearbox providing a range of forward gear ratios and a gear shift mechanism to select different ratios in the main gearbox wherein the operation of the differential assembly is operatively linked to the gear shift mechanism such that when the range change gearbox is in the low range and the main gearbox is in a low ratio the differential assembly is in the locked mode.

8. The transmission as claimed in claim 6, further comprising control means sensitive to vehicle road speed to put the differential assembly in the locked mode when the vehicle is traveling below a high/locked mode threshold road speed.

9. The transmission as claimed in claim 1, wherein the low resistance mode is obtained when the resistance device is connected between the first output and the input.

10. The transmission as claimed in claim 1, wherein the high resistance mode is obtained when the resistance device is connected between the first output and the second output.

11. The transmission as claimed in claim 1, wherein the differential assembly further comprises a sleeve which is moveable between positions in which said operating modes are selected.

12. The transmission as claimed in claim 11, wherein the resistance device has two rotary members, relative rotation of which provides the torque reaction, one rotary member being coupled to the first output and the sleeve being coupled to but axially slideable relative to the other rotary member.

13. The transmission as claimed in claim 12, wherein the sleeve is selectively connected to the differential input to effect the low resistance mode.

14. The transmission as claimed in claim 12, wherein the sleeve is selectively connected to the second differential output to effect the high resistance mode.

15. The transmission as claimed in claim 12, wherein the differential assembly is configured to have a free mode of operation in which there is no resistance to relative motion between the outputs, and the sleeve is selectively disconnected from both the second differential output and the differential input to effect the free mode.

16. The transmission as claimed in claim 12, wherein the differential assembly is configured to have a locked mode of operation in which relative rotation between the outputs is prevented, and the sleeve is selectively connected to the differential input and the second differential output to effect the locked mode.

17. The transmission as claimed in claim 1, wherein the differential assembly comprises an epicyclic gear train having an annulus gear which acts as the input, a sun gear which acts as the first output, a carrier which acts as the second output, a first set of planet gears, each rotatably supported by the carrier and in intermeshing engagement with the annulus gear, and a second set of planet gears each rotatably supported by the carrier and in intermeshing engagement both with a respective planet gear of the first set and with the sun gear.

18. The transmission as claimed in claim 1, wherein the speed sensitive device is a viscous coupling.

19. The transmission as claimed in claim 11, further comprising a range change gearbox having a high range for normal use and a low range for use in difficult conditions and a range change mechanism to effect a change between the high and low ranges.

20. The transmission as claimed in claim 19, wherein the operation of the differential assembly is operatively linked to the range change mechanism such that when the range change gearbox is in the high range the differential assembly is operable in the low resistance mode and when the range change gearbox is in the low range the differential assembly is operable in the high resistance mode.

21. The transmission as claimed in claim 1, further including a main gearbox providing a range of forward gear ratios and a gear shift mechanism to select different ratios in the main gearbox wherein the operation of the differential assembly is operatively linked to the gear shift mechanism such that when the main gearbox is in a low ratio the differential assembly is in the high resistance mode and when the main gearbox is in a high ratio the differential assembly is in the low resistance mode.

22. The transmission as claimed in claim 21, wherein the differential assembly is configured to have a locked mode of operation in which relative rotation between the outputs is prevented, and the operation of the differential assembly is operatively linked to the gear shift mechanism such that when the main gearbox is in a lowest ratio the differential assembly is in the locked mode of operation.

23. The transmission as claimed in claim 21, wherein the differential assembly is configured to have a free mode of operation in which there is no resistance to relative rotation between the outputs, and the operation of the differential assembly is operatively linked to the gear shift mechanism such that when the main gearbox is in a highest ratio the differential assembly is in the free mode of operation.

24. The transmission as claimed in claim 23, further comprising control means sensitive to vehicle road speed, the control means being operative to inhibit the free mode except when the vehicle is traveling above a low/free mode threshold road speed.

25. The transmission as claimed in claim 1, further comprising control means operative to change the differential assembly between the low and the high resistance modes, the control means being sensitive to vehicle road speed to put the differential assembly in the low resistance mode when the vehicle is traveling above a high/low mode threshold road speed and to put the differential assembly in the high resistance mode when the vehicle is traveling below the high/low mode threshold road speed.

* * * * *